United States Patent [19]

Motose et al.

[11] Patent Number: 6,119,453

[45] Date of Patent: Sep. 19, 2000

[54] FEED BACK CONTROL UTILIZING CATALYST

[75] Inventors: Hitoshi Motose; Masahiko Kato, both of Hamamatsu, Japan

[73] Assignee: Sanshin Kogyo Kabushiki Kaisha, Hamamatsu, Japan

[21] Appl. No.: 09/211,428

[22] Filed: Dec. 15, 1998

[30] Foreign Application Priority Data

Dec. 18, 1997 [JP] Japan .................................. 9-349479

[51] Int. Cl.[7] ......................................... F01N 3/00
[52] U.S. Cl. ............................. 60/285; 60/276; 123/672; 123/65 R; 440/89
[58] Field of Search ........................... 60/285, 276, 286; 123/672, 676, 679, 65 R, 430; 440/89

[56] References Cited

U.S. PATENT DOCUMENTS

| | | | |
|---|---|---|---|
| 5,711,148 | 1/1998 | Katoh | 60/276 |
| 5,713,339 | 2/1998 | Kishida et al. | 123/676 |
| 5,832,907 | 11/1998 | Katoh | 123/672 |
| 5,836,155 | 11/1998 | Katoh | 60/276 |
| 5,911,609 | 6/1999 | Fujimoto et al. | 440/89 |

*Primary Examiner*—Thomas Denion
*Assistant Examiner*—Binh Tran
*Attorney, Agent, or Firm*—Knobbe, Martens, Olson & Bear LLP

[57] ABSTRACT

A feed back control system for a direct injected, two cycle engine having a catalytic exhaust. The injection control is modified if the catalyst overheats to control its temperature.

5 Claims, 7 Drawing Sheets

FEED BACK CONTROL UTILIZING CATALYST

BACKGROUND OF THE INVENTION

This invention relates to an engine control and more particularly to an improved engine feed back control for a direct injected, internal combustion engine having a catalyst in its exhaust system.

In spite of the advantages of two cycle engines over four cycle engines in regard to complexity and high specific output, the environmental concerns are causing reappraisal of the continued use of two cycle engines. Specifically, the overlap between the scavenge port and exhaust port opening and closing gives rise to the possibility that unburned hydrocarbons may pass into the atmosphere through the exhaust port.

It has been thought that the performance of these engines can be improved by utilizing such methodologies as feedback control and/or direct cylinder fuel injection in order to improve their performance and make their continued use more feasible.

With feedback control systems, an engine combustion condition sensor such as an oxygen sensor is positioned in proximity to the combustion chamber or the exhaust system so as to sense the oxygen content of the exhaust gases at the completion of the burning cycle. By determining the amount of oxygen present, it is possible to tell if the engine is running rich or lean. Then, feedback control is possible to maintain the desired fuel/air ratio and, accordingly, improve the exhaust emission control.

Direct cylinder injection also is useful in improving engine performance. With direct cylinder injection, the amount of fuel injected per cycle can be more accurately controlled and this is particularly important with two cycle engines.

In addition to the use of feedback control and direct cylinder injection, it may also be necessary or desirable at times to employ a catalyst in the exhaust system for such engine. The catalyst is capable at times of removing constituents that are difficult to remove in other manners or may be a more economically feasible way of treating the exhaust gases.

However, it is known that catalysts operate at fairly high temperatures and this can be a particular problem with marine applications and particularly in outboard motors. Therefore, it is desirable to ensure that the catalyst does not become overheated in its operation even if the feedback control system is operating normally and properly.

It is, therefore, a principal object of this invention to provide an improved feedback control system for a two-cycle engine embodying a catalytic exhaust treatment in addition.

It is a further object of this invention to provide an improved fuel injection control system of the feedback type for a two-cycle marine propulsion engine.

SUMMARY OF THE INVENTION

This invention is adapted to be embodied in a two cycle, crankcase compression, direct cylinder injected internal combustion engine comprised of an engine body defining a plurality of cylinder bores. Pistons reciprocate in each of the cylinder bores. A cylinder head is affixed to one end of the engine body for closing the cylinder bores and defining with the pistons and the cylinder bores a plurality of combustion chambers. A crankcase chamber is formed at the other end of the cylinder bores. A plurality of scavenge ports each interconnecting the crankcase chamber with a respective one of the combustion chambers and is opened and closed by the reciprocation of the respective one of the pistons in the respective of the cylinder bores for admitting an air charge to the combustion chambers. Each of a plurality of exhaust ports is formed in a respective one of the cylinder bores for discharging burned combustion products from the combustion chambers. The exhaust ports are opened and closed by the reciprocation of the pistons in the cylinder bores. The exhaust ports are served by an exhaust system in which a catalyst is positioned. Each of a plurality of fuel injectors sprays fuel directly into a respective one of the combustion chambers for combustion therein. A combustion condition sensor is provided in proximity to one of the fuel injectors for determining the air/fuel ratio in the respective of the combustion chambers. A feedback control system controls the initiation of fuel injection and the duration of all of said fuel injectors based upon the output from the combustion condition sensor to maintain the desired fuel/air ratio. Means sense a higher than desired temperature of the catalyst. The fuel injection by the fuel injectors is modified when the desired temperature of the catalyst is exceeded to permit the catalyst to cool down.

DETAILED DESCRIPTION OF THE PREFERRED EMBODIMENT OF THE INVENTION

Figure 1:
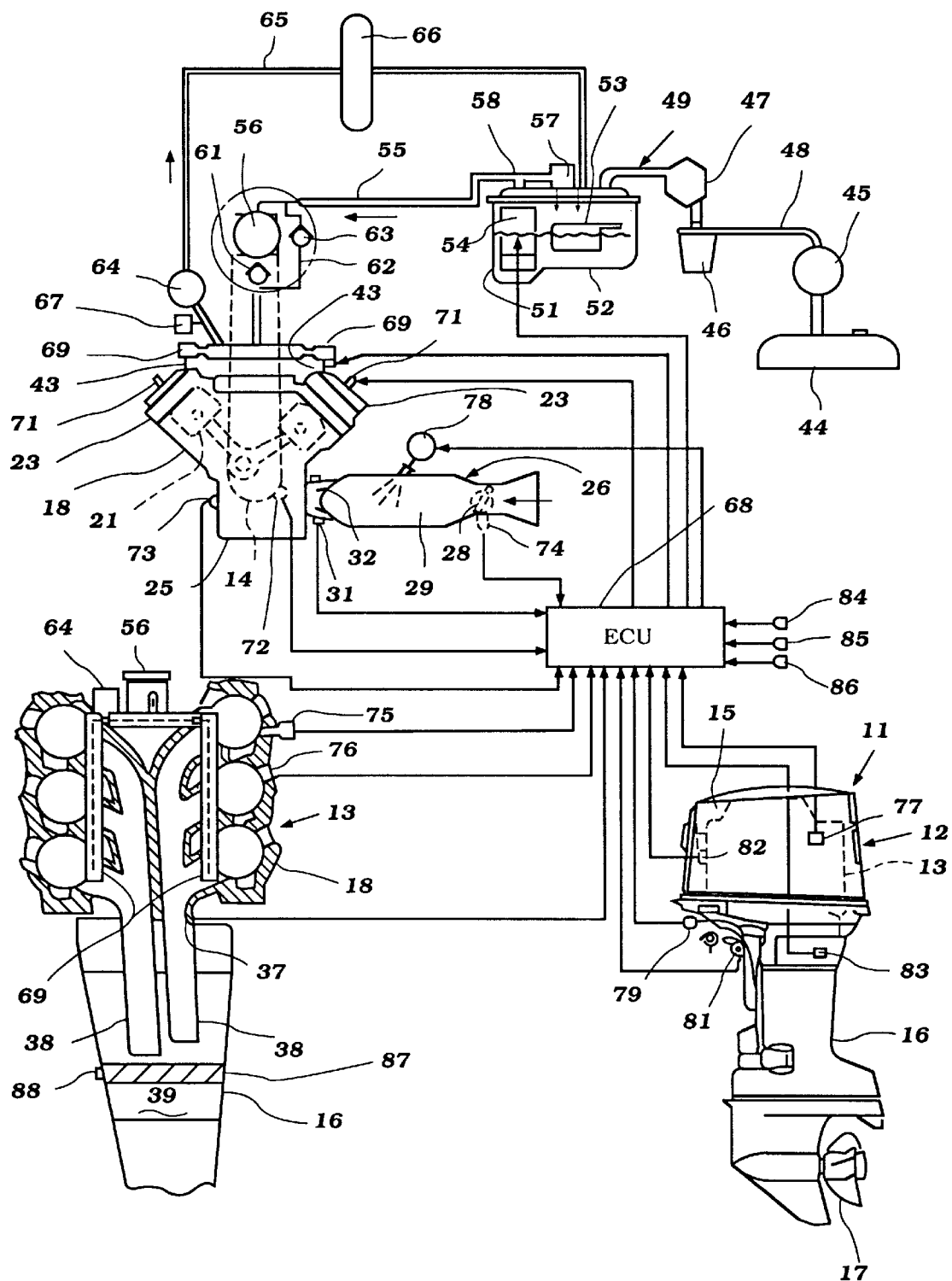
FIG. 1 is a partially schematic view having three portions that are connected by the controlling ECU of the engine. The lower right hand portion of this view shows a side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.

Referring initially primarily to FIG. 1, the lower right hand portion of this view illustrates a side elevational of an outboard motor that is constructed and operated in accordance with the invention. The outboard motor is indicated generally by the reference numeral 11 and except as will hereinafter be noted maybe considered to be of a generally conventional construction.

The outboard motor 11 is comprised of a power head 12 that contains a powering internal combustion engine 13. As best seen in the other two portions of this figure, the engine 13 is, in this embodiment, of the V6 type and operates on a two stroke crankcase compression principal. Although the number of cylinders and cylinder orientation can be varied, the invention has particularly utility in connection with two cycle engines and particularly those having multiple cylinders.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 is coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art.

The outboard motor 11 also includes clamping and swivel brackets or another arrangement for mounting it to the transom of an associated watercraft. Since these types of constructions are well known in the art, further description of them is not believed to be necessary to permit those skilled in the art to practice the invention. The mounting arrangement is such, however, that the height and trim angle of the propeller 17 may be adjusted, even during running. This is significant in the engine control, as will become apparent.

Figure 2:
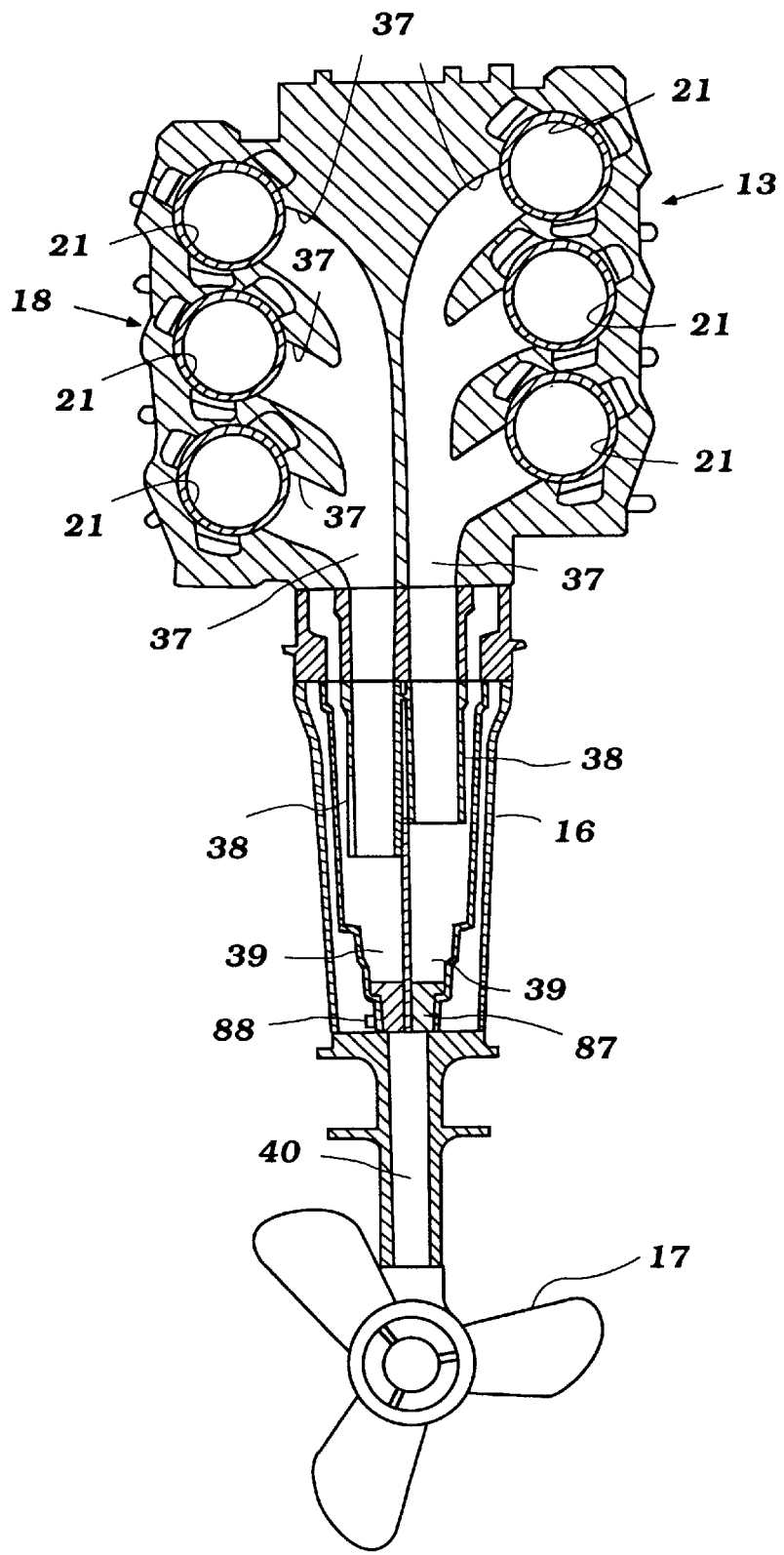
FIG. 2 is an enlarged and more complete view of the outboard motor as shown in the lower left hand view of FIG. 1.

Referring now primarily to the lower left hand view and the upper view of FIG. 1 and additionally to FIG. 2, the engine 13 includes a cylinder block, indicated generally by the reference numeral 18. Because of the V-type configuration employed in this embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23 are affixed to the banks of the cylinder block 18 and close the cylinder bores 21. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of FIG. 1 and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow.

Figure 3:
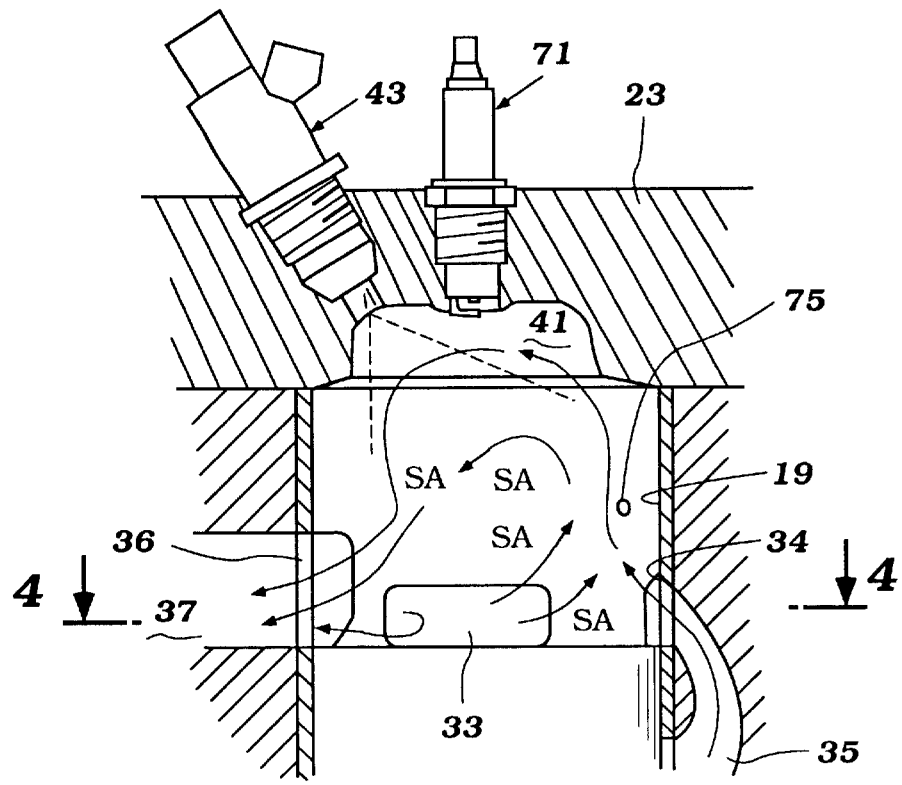
FIG. 3 is an enlarged cross-sectional view taken through a single cylinder of the engine and depicts part of the theory by which the control strategy operates.
Figure 4:
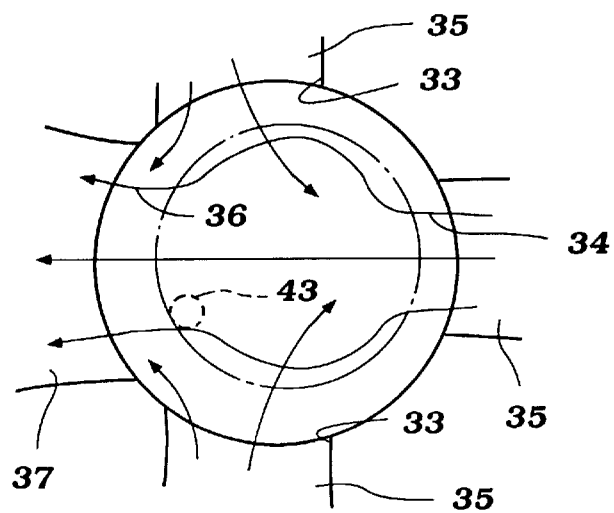
FIG. 4 is a cross-sectional view taken along the line 4—4 in FIG. 3 to further show the scavenging air flow pattern and the path of injected fuel.

Referring now additionally to FIGS. 3 and 4, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34 and 35. As is well known in two cycle practice, the scavenge ports 33 and 34 are opened and closed by the reciprocation of the pistons 21 in the cylinder bores 19.

It should be noted that the main scavenge ports 33 are disposed on opposite sides of an exhaust port 36 which is diametrically opposite the auxiliary scavenge port 34. As may be best seen in the lower left hand portion of FIG. 1 and in FIG. 2, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into a pair of expansion chambers 39 formed in the driveshaft housing and lower unit 16. These expansion chambers 39 communicate with a suitable high speed underwater exhaust gas discharge and a low speed, above the water exhaust gas discharge of any known type.

The underwater exhaust gas discharge is shown primarily in FIG. 2 and includes a conduit 40 that depends through the lower unit portion of the drive shaft housing lower unit and which communicates through the hub underwater discharge formed in the propeller 17.

As has been previously noted, the trim and height of the propeller 17 can be adjusted and this adjustment will change the depth of submersion of the underwater discharge during engine running. In addition, various water conditions may also cause this height to vary during engine running. Thus, the back pressure on the exhaust system will be variable and this back pressure is particularly significant in effecting the rate of air flow in scavenging the combustion chambers of the engine. Thus, a condition is present with marine applications that is not existent normally in automotive applications and which can seriously effect the feedback control, as will be described shortly.

As the pistons 21 move downwardly in their cylinder bores 19 toward the bottom dead center position shown in FIG. 3, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. The flow of scavenging air is shown in FIGS. 3 and 4 by the arrows SA.

In accordance with an important feature of the invention, the engine 13 is provided with a direct cylinder fuel injection system. This fuel injection system is shown in part schematically in the upper portion of FIG. 1 and will now be described by particular reference to that figure. Before referring thereto, however, it should be noted that fuel injectors 42 are mounted in the cylinder head assembly 23 so as to spray fuel from this fuel supply system directly into the combustion chambers 41. The location and functioning of these fuel injectors 43 will be described after the system which supplies fuel to them has been described.

As is typical with outboard motor practice, the outboard motor 11 is supplied with fuel from a main fuel tank 44 which is normally mounted within the hull of the associated watercraft. Fuel is supplied form this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 47 in the power head 12 collects the fuel from the fuel filter 46 and delivers it to a vapor separator, indicated generally by the reference numeral 49. The low pressure fuel pumps 48 may be of the type that are operated by crankcase pressure variations as is well known in this art.

The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 47 but a pressure that is not really high enough for effective high pressure direct cylinder injection.

This fuel is discharged from the vapor separator housing 51 through a supply conduit 55 to a high pressure, engine driven, positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in the main fuel manifold 59 and limits the maximum pressure of the fuel supply to the fuel injectors 43. This is done by dumping fuel back to the vapor separator assembly 49 through a return line 65. A fuel heat exchanger or cooler 66 may be provided in this return line 65 so as to ensure that the fuel is not at too high a temperature.

A pressure sensing device 67 is provided also in the main fuel manifold 59 for providing a fuel pressure signal to an ECU, indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIGS. 3 and 4, the fuel injectors 43 are mounted in the cylinder head assemblies 23, in the illustrated embodiment, over the exhaust ports 36 on the exhaust side of the engine. These injectors spray downwardly toward the heads of the pistons 21. The fuel injectors 43 are preferably of the solenoid operated type and have a solenoid valve which, when opened, controls the discharge of fuel into the combustion chambers as shown in broken lines in FIG. 3 so as to provide a fuel patch in the combustion chamber, the size of which depends upon the duration of fuel injection as will become apparent.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69 in connection with a feed back control system, preferably as described in our aforenoted copending application. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the control of fuel injection during transient conditions and particularly those involving substantial changes in engine speed.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this condition.

As noted, the ECU 68 may operate on a feedback control condition and thus, an air fuel ratio sensor 75 is provided that communicates with the combustion chambers or exhaust port of at least one of the cylinder. Preferably, an oxygen sensor is utilized for this purpose, although other types of devices may be employed.

In order to provide a good indication of the fuel/air ratio, it is important that the oxygen sensor 75 is positioned so that it will sense the combustion products near the completion of combustion and before a fresh charge of air is delivered to the combustion chamber. Therefore, and as best shown in FIG. 3, the oxygen sensor 75 is provided so that its probe opens into the cylinder bore 19 at a point that is disposed slightly vertically above the upper edge of the exhaust port 36. In this way, the oxygen sensor 75 will be in a position to receive combustion products immediately before opening of the exhaust port and most positively before the opening of the scavenge ports so that it will sense the combustion products at the time combustion has been substantially completed.

Engine temperature is sensed by a engine temperature sensor 76.

The temperature of the cooling water drawn from the body of water in which the watercraft or outboard motor 11 is operated is measured by a water temperature sensor 77. As has been noted, those sensors described may be just typical of any of the wide variety of sensors utilized for engine control.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

It has already been noted that the adjustment of the angle of the propeller 17 will change the vertical position of its high-speed exhaust discharge and accordingly the back pressure. Thus, there are provided additional sensors which sense factors that will indicate this depth. These comprise an engine height sensor 79 that is mounted on the outboard motor 11 and which senses its height adjustment. Also, a trim angle sensor 81 is provided which senses the adjusted trim angle.

Other sensors may also be employed for control and some of these are associated with the engine 13 or the outboard motor 11 itself. These may include an engine vibration or knock sensor 82 and a neutral sensor 83. The neutral sensor 83 cooperates with the aforenoted forward, neutral, reverse transmission and will provide an indication of when the watercraft is operating in neutral.

Also shown schematically in FIG. 1 is a watercraft speed sensor 84 and a watercraft pitch sensor 85 that will sense the condition of the watercraft relative to the body of water and again indirectly the back pressure in the exhaust system. Finally, there is provided an atmospheric pressure sensor 86. Of course, the sensors described are only typical of those types of sensors which may be employed for the feedback control system, as will become apparent.

The components of the system as thus far described may be considered to be conventional and for that reason, where any component has not been illustrated or described in detail, reference may be had to conventional or known structures with which to practice the invention.

In accordance with the basic feed back control strategy, the injection timing is initiated before a point where the injected fuel path toward the exhaust port 36 and considering the air flow within the combustion chamber will not reach the exhaust port before it has fully closed. Since this invention relates primarily to control under certain specific running conditions namely transient speed conditions, a full description of the basic control strategy is not believed necessary to understand or practice this invention.

However, in accordance with the basic control strategy, the fuel injection is initiated at a time after bottom dead center and before exhaust port closing and continuing to a point before the exhaust port closes. The actual time of starting of injection and the duration are controlled by a feedback control and certain portions of that routine will now be described.

Figure 5:
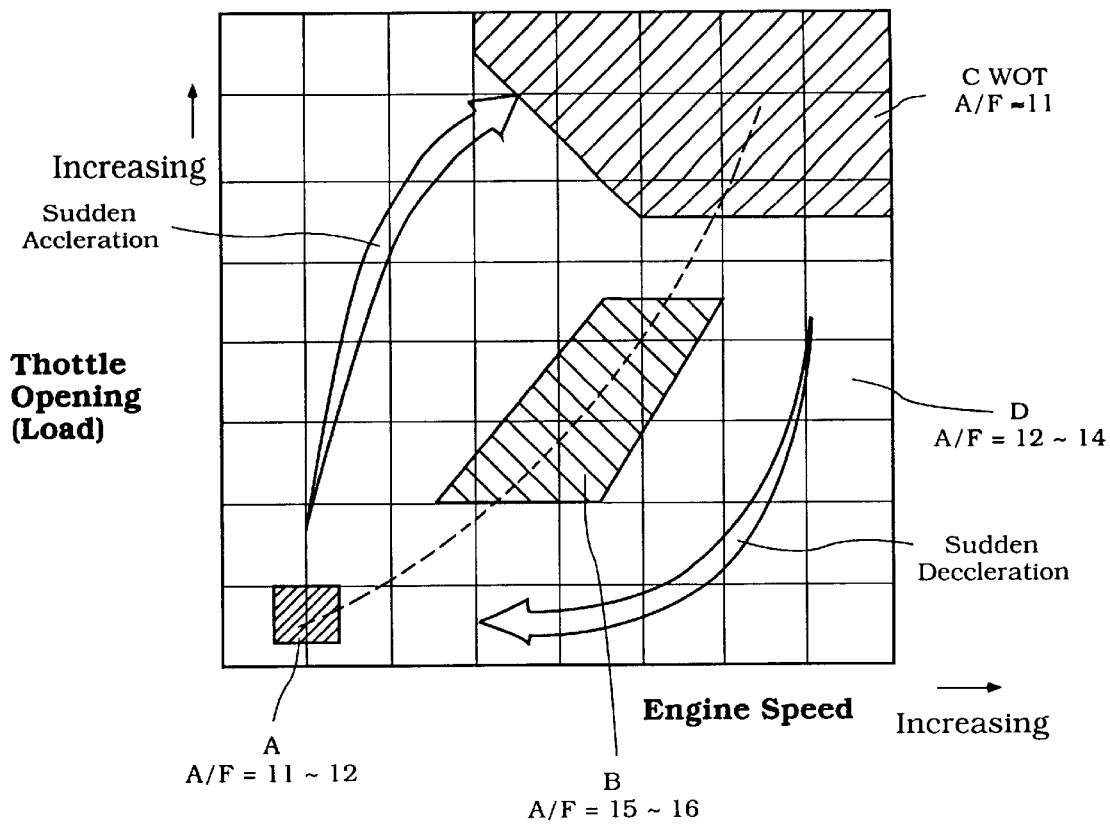
FIG. 5 is a map that shows the different control ranges that are employed in conjunction with the invention.

The various feed back operating ranges are shown in FIG. 5, as aforenoted and will now be described. FIG. 5 is a graphical view showing the determinations that are made in the ECU 68 to determine the engine operational range. Under light loads and speeds the mixture is kept rich and the air/fuel ratio is set so as to be in the range of about 11 to 12 to 1. This range is indicated by the reference character A.

In midrange conditions there is a control range indicated at B where the engine is operated in a lean burn condition and the mixture may be somewhat stratified. This range is indicated by the reference character B and in this range the air/fuel ratio is maintained in the range of about 15 to 16 to 1.

Under high load/high speed conditions which approaches wide open throttle, there is a third control range indicated at C where the mixture is run on the excessively rich side to protect the engine from damage. In this range, the air to fuel ratio is maintained about 11 to 1.

There is a remaining range outside of those noted which is indicated at D and in this range the mixture is kept on the weak side of rich, i.e., around 12 to 14 to 1.

There are also two other types of conditions which are indicated by the open arrows one of which represents sudden acceleration and the other of which indicates sudden deceleration and it is with these ranges that the invention relates. This strategy will be described shortly.

Figure 6:
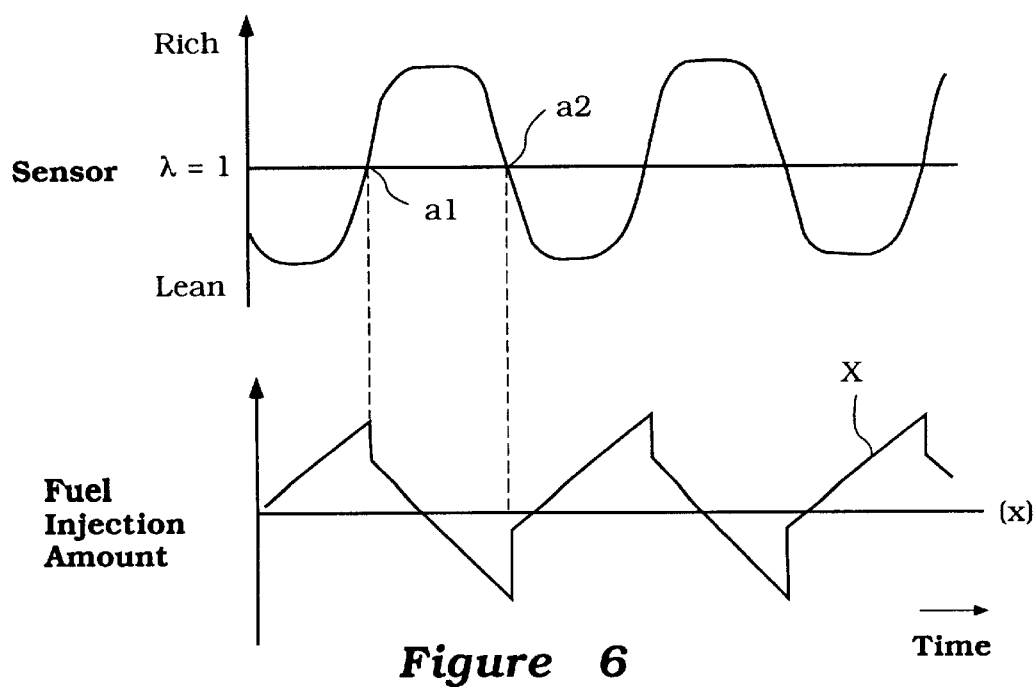
FIG. 6 is a graphical view showing the sensor output and change in the injection of fuel in the feed back control routine.

In each of the feedback control ranges, A–D, a routine as shown in FIG. 6 is followed. The upper portion of this figure shows the output of the oxygen sensor 75. As may be seen, the sensor output varies on either side of stoichiometric by going successively from lean to rich. When the mixture crosses over from lean to rich as shown at the time a1, the fuel injection amount shown in the lower curve is decreased. In a typical feedback control routine, an initial relatively large incremental fuel decrease occurs and subsequently lesser amounts of fuel are supplied at progressive time intervals until at the time a2 the sensor output shifts from rich back to lean. The program then moves to increase the amount of fuel injected first in a large step and subsequently in incremental steps so that the amount of fuel injected X varies again to bring the mixture back into the stoichiometric ratio.

Although the feedback control system described is very effective in providing good exhaust emission control, it may be desirable to further treat the exhaust gases or act on them in such a way so as to avoid the emission of unburned hydrocarbon. Therefore, a catalyst, indicated schematically at 87, is positioned in a suitable location within the exhaust system. In FIGS. 1 and 2, this is illustrated as being in the expansion chamber 39 but the actual location can be varied depending upon the particular type of catalyst utilized in the particular type of control desired. Cooperating with the catalyst 87 is a catalyst temperature sensor 88 which functions so as to sense the temperature of the catalyst and provide a signal indicative of its temperature to the control system, as will become apparent. This is done so as to permit a shift from the feedback control routine to a different control routine for catalyst protection when the catalyst 87 over heat as determined by the output of the sensor 88.

Figure 7:
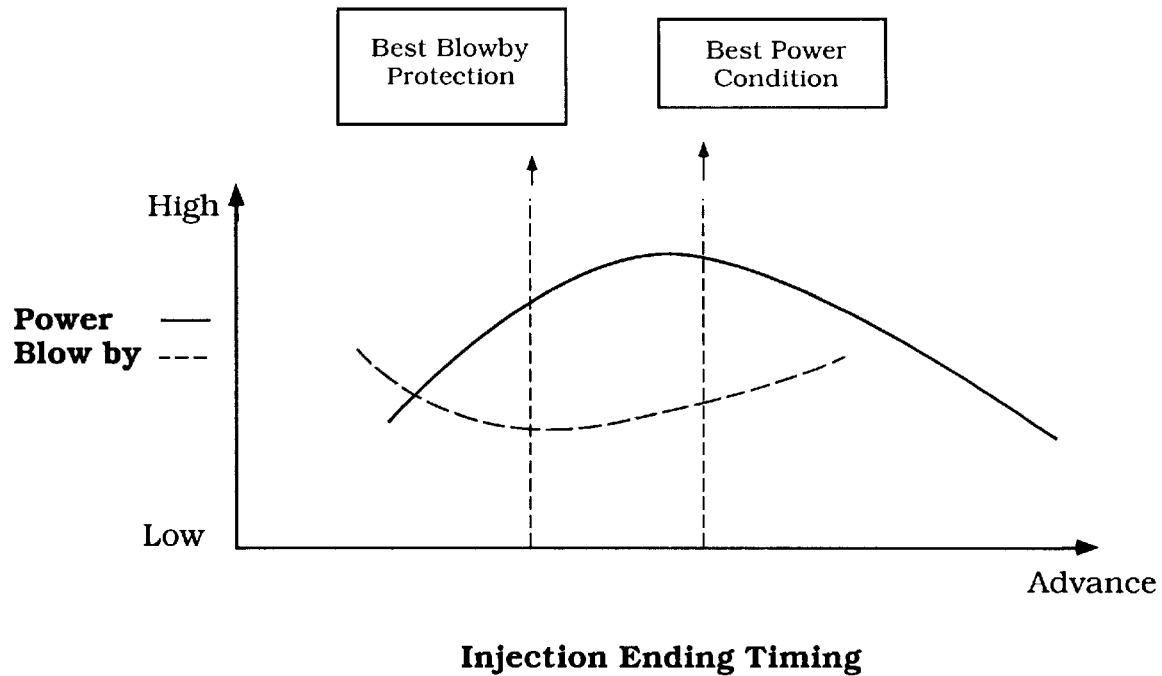
FIG. 7 is a graphical view showing how injection time can effect both the power output of the engine and also the amount of hydrocarbons that may enter the exhaust system.
Figure 8:
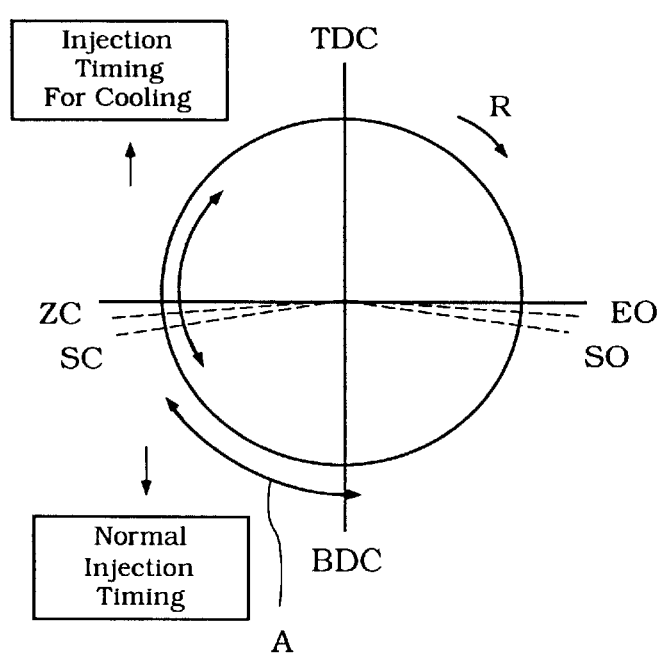
FIG. 8 is a graphical view showing the cylinder timing and fuel injection pattern during normal feedback control and during catalyst protection control.

FIG. 7 is a view that shows the engine power output in solid lines in relation to injection ending timing. Also shown in broken lines in this figure is the amount of hydrocarbons that are blown by the exhaust gases in response to the same parameters. Ideally, the system is operated under the feedback control routine so as to maintain maximum power output and thus, the normal feedback control injection timing is as shown in FIG. 8 by the curve A. Basically, this is done so that injection takes place before the exhaust port has closed and is completed prior to the time that it has fully closed. This is done so as to ensure that unburned fuel cannot escape through the exhaust port.

However, if a condition arises when the catalyst is overheating, then further protection is done by retarding the injection timing and also shortening its duration so that it ends after the exhaust port is closed and not operating in the portion of the curve where there is low exhaust blowby. This is the control range B in FIG. 8.

Figure 9:
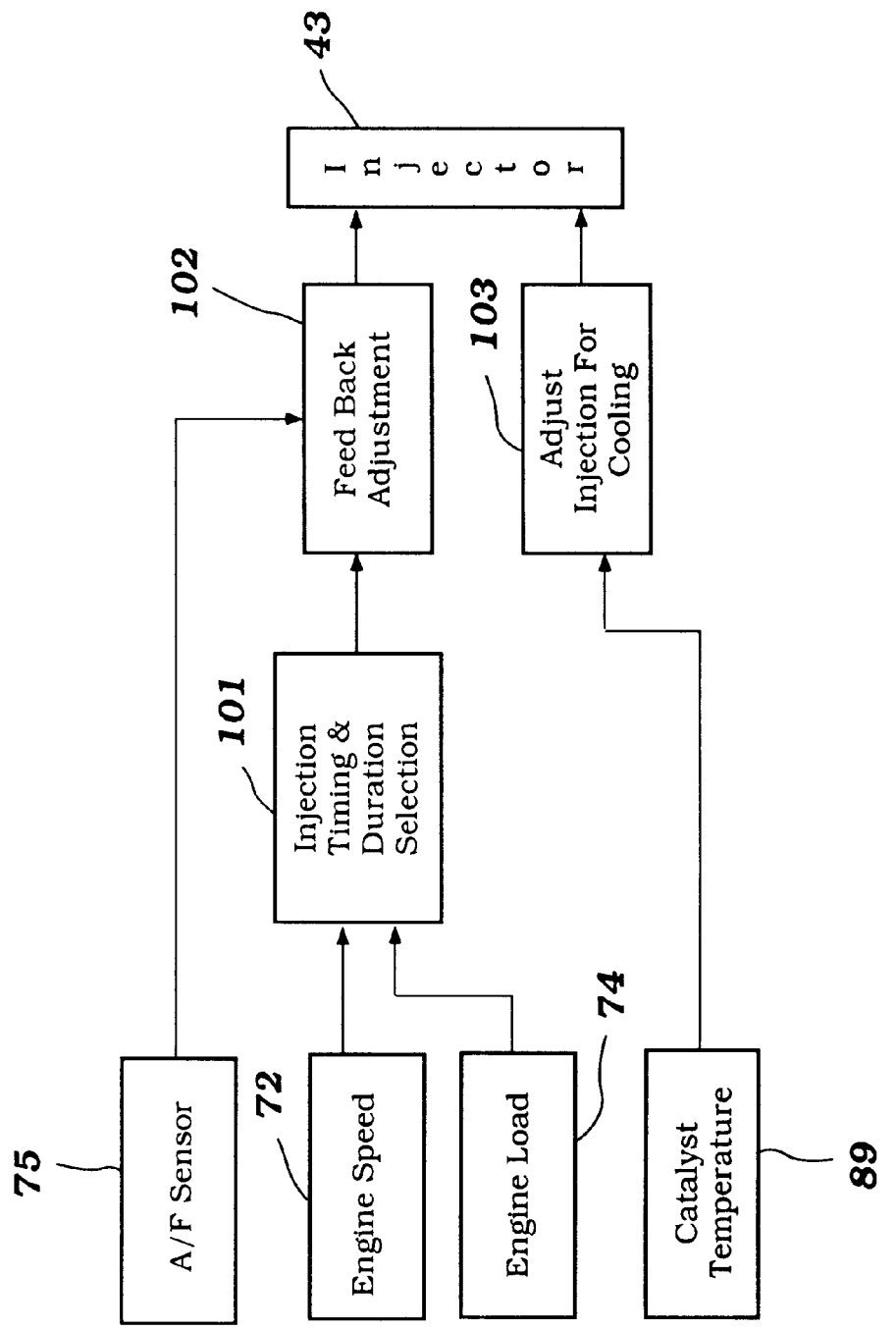
FIG. 9 is a block diagram showing the various elements that the fuel injection control and particularly those associated with the catalyst protection.

Thus, in accordance with a system for practicing the invention, the ECU is provided with a control portion which is shown schematically in FIG. 9. In this figure, the engine speed and engine load is read from and is, in fact, determined by the crank angle sensor 72 and the throttle position sensor 74. This information is output to a section 101 of the ECU 68 that sets the injection amount for the engine running conditions to determine the desired fuel air ratio in accordance with the appropriate map from FIG. 5.

The output from the oxygen sensor 75 is transmitted to a feedback control section 102 of the ECU 68 so as to modify that the signal from the injection amount setter 101 in the manner which is previously described in conjunction with FIG. 6.

In addition, however, the catalyst temperature sensor 89 outputs a signal to an injection duration and injection timing adjusting section 103 of the ECU 68 so as to modify the fuel injection control from that provided for by the feedback control. This shifts or retards the injection timing and the duration as seen in FIG. 8.

Figure 10:
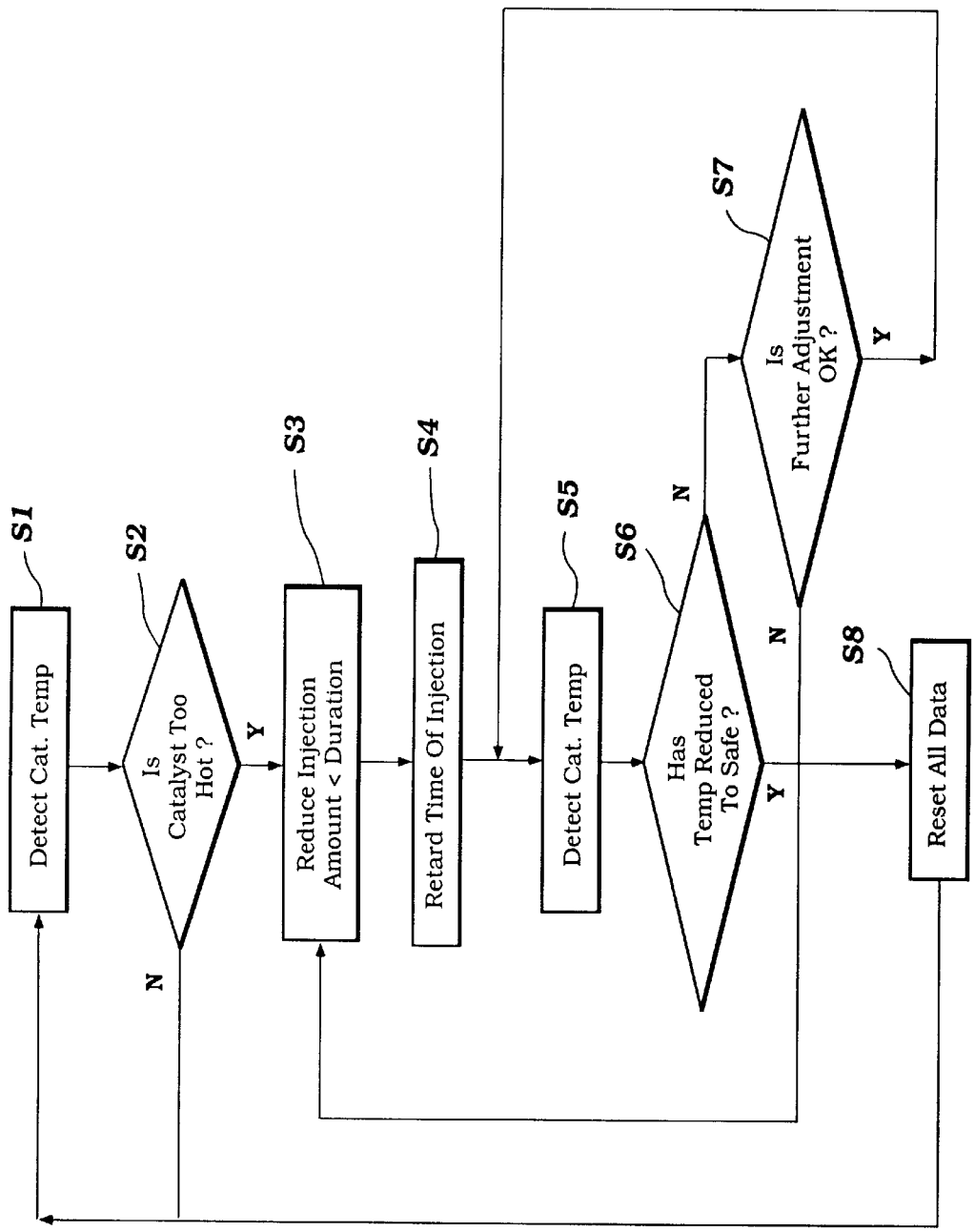
FIG. 10 is a block diagram showing the control routine of this embodiment.

This control routine may be understood best by reference to the control routine diagram of FIG. 10. In this routine, the program starts at the step S1 by detecting the catalyst temperature.

The program then moves to the step S2 so as to compare or detect the catalyst temperature with a predetermined high temperature limit. If the temperature is not above that limit, the program repeats.

If, however, the catalyst is determined to be overheated at the step S2, the program moves to the step S3 to initiate protective action. The first action taken is to set an adjusted value of shorter duration for reducing the amount of fuel injected.

The program then moves to the step S4 so as to also retard the timing of beginning of fuel injection.

Then, the program moves to the step S5 to take another reading of the catalyst temperature. The program then moves to the step S6 to determine if the catalyst temperature has fallen below the predetermined high value.

If the temperature is still not below the predetermined high value, the program moves to the step S7 so as to see if the adjusted values are still within the maximum permissible adjustment in fuel injection duration and timing. If the values are still within the range, the program moves back to the step S3 so as to make further adjustments.

If, however, as discussed in S8, the adjustments are approaching or outside the limit, then the program moves back to the step S5 to again read the catalyst temperature.

This repeats until the catalyst temperature falls below the predetermined high value at the step S6 and the program then moves to the step S7 so as to clear all of the adjusted data and return back to the step S1.

Thus, it should be readily apparent that the described system is very effective in providing good engine control and particularly engine exhaust emission control. This is done by applying feedback control under all normal engine running conditions and as long as the catalyst temperature does not exceed the predetermined value. If it does, however, then the necessary adjustments are made from the feedback control to bring the catalyst temperature back into its operating range.

Of course, the foregoing description is that of a preferred embodiment of the invention and various changes and modifications may be made without departing from the spirit and scope of the invention, as defined by the appended claims.

What is claimed is::

1. A two cycle crankcase compression internal combustion engine comprised of an engine body that defines a cylinder bore, a piston reciprocating in said cylinder bore, said cylinder bore being provided with at least one scavenge port and at least one exhaust port that are opened and closed by the reciprocation of said piston, an exhaust system for discharging exhaust gasses from said exhaust port to the atmosphere, a. catalyst in said exhaust system, a fuel injector mounted in said engine body for injecting fuel directly into a combustion chamber formed by said piston and said engine body, means for supplying fuel under pressure to said fuel injector, a combustion condition sensor for sensing the air fuel ratio, feed back control means for controlling the timing of beginning and duration of fuel injection in response to the signal from said combustion condition sensor, a catalyst temperature sensor, and means for adjusting at least one of the fuel injection initiation time and the fuel injection duration upon the sensing of catalyst temperature above a predetermined value to reduce the catalyst temperature.

2. A two cycle crankcase compression internal combustion engine as set forth in claim 1 wherein fuel injection initiation time is retarded to reduce the catalyst temperature.

3. A two cycle crankcase compression internal combustion engine as set forth in claim 1 wherein the fuel injection duration is reduced to reduce the catalyst temperature.

4. A two cycle crankcase compression internal combustion engine as set forth in claim 3 wherein fuel injection initiation time is retarded to reduce the catalyst temperature.

5. A two cycle crankcase compression internal combustion engine as set forth in claim 4 wherein fuel injection initiation time is retarded after the fuel injection duration is reduced.

* * * * *